United States Patent [19]

Gordon et al.

[11] 4,414,206

[45] Nov. 8, 1983

[54] ANIMAL FEEDS

[75] Inventors: Maxwell Gordon, Dewitt; George J. Christie, Skaneateles, both of N.Y.

[73] Assignee: Bristol-Myers Company, New York, N.Y.

[21] Appl. No.: 338,393

[22] Filed: Jan. 11, 1982

Related U.S. Application Data

[63] Continuation of Ser. No. 156,787, Jun. 12, 1980, abandoned, which is a continuation-in-part of Ser. No. 59,011, Jul. 19, 1979, abandoned.

[51] Int. Cl.$^3$ ............................................. A61K 37/00
[52] U.S. Cl. ..................................................... 424/177
[58] Field of Search ........................................ 424/177

[56] References Cited

U.S. PATENT DOCUMENTS 3,126,317  3/1964  Heinemann et al. .
4,206,203  6/1980  Ingle et al. .

OTHER PUBLICATIONS

Woodbine, Antibiotics and Antibiosis in Agriculture, Butterworths, London (1977) pp. 20-21.
Antibiotics and Chemotherapy 3, 1239-1242 (1953) B. Heinemann et al.
Antibiotics Annual 1954-1955, Medical Encyclopedia, Inc., New York, N.Y., pp. 1011-1019, D. Tisch et al.
Antibiotic Medicine and Clinical Therapy, vol. III, No. 2, pp. 142-145 (1956), G. A. Cronk et al.
Swann Committee Report, Nov. 1969, London.

*Primary Examiner*—Jerome D. Goldberg
*Attorney, Agent, or Firm*—David M. Morse

[57] ABSTRACT

Method of promoting growth and improving feed efficiency in economically important animals which comprises the oral administration to said animals of feed containing an effective amount of amphomycin.

2 Claims, No Drawings

ANIMAL FEEDS

CROSS-REFERENCE TO RELATED APPLICATION

This application is a continuation of our co-pending application Ser. No. 156,787 filed on June 12, 1980 now abandoned which is a continuation-in-part application of our prior, co-pending application Ser. No. 59,011 filed July 19, 1979, now abandoned.

BACKGROUND OF THE INVENTION

1. Field of the Invention

This invention relates generally to promotion of growth in economically important animals. More specifically it relates to a method for accelerating the growth rate and simultaneously increasing the feed-utilization efficiency in such animals.

2. Description of the Prior Art

It is well-known that the acceleration of growth rates and an increase in the efficiency of feed utilization in economically important animals is an important consideration in agricultural economics. A faster growth rate allows greater use of the facilities employed in raising the animal, thus improving return on investment. An increase in the efficiency of feed utilization results in a lowered cost of production.

In the search for effective growth promotants, it is generally recognized that a relatively small improvement in growth rates and feed efficiency can be advantageous. Thus, for example, in broiler chickens a growth rate acceleration of 3% or more and an increase in feed efficiency of about 2% or more is economically worthwhile, particularly where the active compound is used in relatively small quantities and is favorably priced to the user.

Heretofore a number of compounds have been used as growth promotants for animals. Among such compounds are some antibiotics such as penicillin G, bacitracin, chlortetracycline, tylosin, lincomycin and flavomycin. It is known, however, that antibiotics vary in their effectiveness in stimulating growth and increasing feed efficiency and that some are effective for one purpose and ineffective for the other. Providing a compound which gives significant improvement in both rate of growth and feed-conversion efficiency would, therefore, constitute a significant advance in the art.

The antibiotic amphomycin is disclosed and claimed in U.S. Pat. No. 3,126,317. The production and properties of amphomycin are also described in Antibiotics and Chemotherapy, 3, 1239–1242 (1953), Antibiotics Annual 1954–1955, Medical Encyclopedia, Inc., New York, N.Y. at pages 1011–1019 and Antibiotic Medicine and Clinical Therapy, Vol. III No. 2, 142–145 (1956). None of the published literature on amphomycin, however, discloses use of this compound as a feed growth additive.

Amphomycin is an acid polypeptide and readily forms salts with pharmaceutically acceptable bases, e.g. the sodium, ammonium, calcium and aluminum salts. As used herein and in the claims the term amphomycin refers to the free acid or a pharmaceutically acceptable salt thereof.

SUMMARY OF THE INVENTION

This invention provides a novel method for promoting growth and improving feed conversion efficiency in animals which comprises the oral administration to said animals of feed containing an effective amount of amphomycin. Also provided by the present invention is a novel feed composition for animals which comprises a nutritionally balanced feed composition in which there is incorporated therein an amount of amphomycin effective for promoting growth and improving feed conversion efficiency.

The present invention is applicable to all types of non-human animals, but is particularly useful with economically important animals such as chickens, pigs, cattle, turkeys, geese, ducks, horses, goats, rabbits and sheep. Especially important non-ruminant animals are chickens and pigs and important ruminant animals include cattle, sheep and goats.

It has been found that daily oral administration of a growth-promoting quantity of amphomycin as a component in the feed consumed by animals significantly accelerates the growth rate of the animals and simultaneously improves the efficiency of feed utilization. In tests in broiler chickens, for example, amphomycin used in concentrations of from about 4 to 12 grams per ton of conventional feed resulted on average in the chickens gaining about 3% more weight and consuming 3% less total feed than comparable chickens fed the same diet without amphomycin. In general cncentrations of amphomycin between about 4 and 100 grams per ton of feed have been found to be effective for improving the growth rate and the efficiency of feed utilization in both ruminant and non-ruminant animals.

The amphomycin may be added to any nutritionally adequate feed commonly used to feed animals and known to those skilled in the feed art. Such feeds contain grains, fats, minerals, vitamins and the like known constituents in proportions dependent upon the animal to be fed.

Addition of the amphomycin to the feed may be accomplished by known procedures. For example, amphomycin (or a nontoxic salt thereof such as described in U.S. Pat. No. 3,126,317; considered for purposes of the present invention to be equivalent to amphomycin per se) can be incorporated directly into the animal feed in a concentration of from 4–100 grams per ton of feed and, by mixing, uniformly distributed throughout. In an alternate and preferred embodiment, the amphomycin can be added to an edible non-toxic diluent, preferably a material having nutritional value, to provide a highly concentrated premix. Using amphomycin concentrate (4 g. amphomycin/lb.), such a premix may be prepared so as to contain from about 10–30 pounds of amphomycin concentrate per 100 pounds of premix. A sufficient quantity of the premix is then incorporated in the feed to provide a feed composition containing from 4–100 grams of amphomycin per ton of feed.

The amphomycin-supplemented feed prepared as above when made available to the animal for feeding, ad libitum, results in significantly improved growth rates and feed-utilization efficiency.

In another aspect of the present invention, it has been found that amphomycin when orally administered to ruminant animals having a developed rumen function changes the digestive fermentation of such animals to produce more propionates relative to the production of acetates, thus improving feed utilization efficiency.

It is known that the efficiency of carbohydrate utilization in ruminants is increased by treatments which stimulate the animal's rumen flora to produce propionate compounds rather than acetate compounds (see, for example, U.S. Pat. No. 3,839,557). Also, the efficiency of carbohydrate use can be effectively monitored by observing the production and concentration of propionate compounds in the rumen. If the animal is making more propionates, it will be found to be using its feed more efficiently.

A standard in vitro method for determining compounds which stimulate propionate production during rumen fermentation is the artificial rumen method described in U.S. Pat. No. 3,794,732. When amphomycin was subjected to this in vitro procedure, it was unexpectedly found to significantly increase the production of propionates in the rumen, thus indicating effectiveness in increasing the efficiency of feed utilization in ruminants. This property in ruminants is presumably in addition to the previously-described feed-utilization efficiency promoting activity of amphomycin in monogastric animals which involves a different mechanism of action.

Amphomycin is typically effective in increasing the efficiency of feed-utilization when administered to ruminants orally as a feed additive in concentrations of from about 4 to 100 grams per ton of feed. Appropriate feed compositions containing amphomycin as a feed additive may be prepared as described above.

As indicated in Example 2 below, the in vitro artificial rumen test indicates that amphomycin significantly inhibits methane production as well as increases propionate production. Methane formation is responsible for "bloat" in cattle and also leads to reduced feed efficiency. Also, amphomycin does not significantly inhibit cellulose (cellulose digestion) or affect total calories digested.

The use of amphomycin as a feed additive may be further understood by referring to the examples set forth below, which are provided solely for illustration and are not intended to limit the scope of the invention.

EXAMPLE 1

The efficacy of amphomycin in promoting growth and improving the feed efficiency of broiler chicks is illustrated below.

In this example a basal diet was employed containing the following ingredients:

|  |  |
|---|---|
| Ground yellow corn | 544.1 lbs. |
| Soybean meal (dehulled) | 290.4 lbs. |
| Corn gluten meal (60%) | 25.0 lbs. |
| Fishmeal-herring (65%) | 25.0 lbs. |
| Meat & bone meal (47%) | 25.0 lbs. |
| Dicalcium phosphate | 5.0 lbs. |
| Limestone | 8.0 lbs. |
| * Trace mineral mix | 1.5 lbs. |
| Iodized salt | 4.0 lbs. |
| ** Premix #1A | 5.0 lbs. |
| *** Premix #2A | 5.5 lbs. |
| Choline chloride (25%) | 2.6 lbs. |
| Vitamin A concentrate (30,000 units) | 35 grams |
| Methionine | 0.4 lbs. |
| Fat | 53.5 lbs. |
| Total | 995.0 lbs. |

* Trace mineral mix contains manganese oxide, ferrous carbonate, potassium iodide, cupric oxide, cobalt sulfate and zinc oxide, all of which are distributed on calcium carbonate.
** Premix #1A consists of

| Vitamin A Conc. 30,000 IU/g | 1.47 lbs. |
|---|---|
| Vitamin D Conc. 3,000 ICU/g | 7.35 lbs. |
| Hydrogenated Animal-Vegetable Fat | 0.91 lbs. |
| Soy meal (dehulled) | 90.27 lbs. |
|  | 100.00 lbs. |

-continued

*** Premix #2A consists of

| Riboflavin (20 g/lb) | 1.50 lbs. |
|---|---|
| Ca Pantothenate (32 g/lb) | 1.56 lbs. |
| Niacin | 0.44 lbs. |
| ≠ Koagulone (16-S) Vitamin K Conc. | 1.89 lbs. |
| B12 (60 mg/lb) | 2.00 lbs. |
| Hydrogenated Animal-Vegetable Fat | 0.93 lbs. |
| ≠≠ Soy meal (dehulled) | 91.68 lbs. |
|  | 100.00 lbs. |

≠ Equivalent to 5.28 g menadione/lb.
≠≠ Soy-Fat Mix (92.61 lbs.)

Procedure:

Male broiler chickens (Hubbard breeder pullet X-White Mountain males) were used as the test animal. They were housed in electrically heated, metal battery brooders equipped with raised wire-screen floors. An attempt was made to raise the level of contamination of the unit for a more effective bacteria load as a stress for testing the antibiotic. The room and battery units were left unclean from a previous test that terminated before the chicks were started. Drinking water for the test came from overflow water from a laying cage operation. The water was collected in garbage cans and was allowed to stand overnight to permit particulate matter to settle out. The birds were vaccinated at 7 days of age for Newcastle, Bronchitis and Marek's. The feed trays were fitted with wire screens riding on top of the feed to minimize feed wastage. Feed and water were fed ad libitum. Four groups of ten birds each, chosen on the basis of hatching body weight, were fed the experimental diet for a four week test period and four groups were fed the control diet. The groups of birds and diets were placed in the batteries on the basis of position chosen from tables of random numbers. The birds and the feed were group weighed on a weekly basis. The test was terminated at four weeks of age.

The control diet was prepared as follows:

| +Premix-69 | 0.50 lbs. |
|---|---|
| Basal diet (as given above) | 99.50 lbs. |
| Total | 100.00 lbs. |

The experimental diet (for amphomycin concentration of 4 grams/ton) was prepared as follows:

| ++Premix-75 | 0.50 lbs. |
|---|---|
| Basal diet | 99.50 lbs. |
| Total | 100.00 lbs. |

+Premix-69 consists of:

| Nutrigard (50% ethoxyquin) | 4.99 lbs. |
|---|---|
| Fat | 0.85 lbs. |
| Soy protein | 94.16 lbs. |
| Total | 100.00 lbs. |

++Premix-75 consists of:

| Nutrigard (50% ethoxyquin) | 4.99 lbs. |
|---|---|
| Fat | 0.85 lbs. |
| Soy protein | 84.25 lbs. |
| Amphomycin concentrate (4 g amphomycin/lb.) | 9.91 lbs. |
| Total | 100.00 lbs. |

Results:

The table below indicates the average four week body weight, average percentage change in body weight, average feed efficiency and average percentage change in feed efficiency. As indicated amphomycin at a concentration of 4 grams/ton of feed resulted in a 6.21% increase in body weight and a 4.07% increase in feed efficiency.

Results of Four Week Study Using 4 Grams/Ton Amphomycin

|  | Body Weights in grams at 4 weeks of age | Percentage increase in weight at end of 4 weeks | Feed efficiency calculated as consumption in grams ÷ average body weight in grams* | Improvement in feed efficiency |
|---|---|---|---|---|
| Amphomycin Exp. Group | 817.5 | 6.21% | 1.480 | 4.07% |
| Control Group | 769.7 | — | 1.553 | — |

*calculated for both groups at 800 grams body weight from feed efficiency curve. A feed efficiency curve was calculated using the growth and feed consumption data for each weigh period. The slope of this line represents feed efficiency. Curve followed equation $Y = aX^b$ where $X$ = average body weight in grams and $Y$ = average feed consumption in grams.

EXAMPLE 2

Artificial Rumen Test

Amphomycin was evaluated at doses of 0.025, 0.1 and 0.5 mg per incubation (25 ml. inoculum—artificial saliva with cellulose, starch and urea as nutrients) according to the general procedure of Example 5 of U.S. Pat. No. 3,794,732. The results of the test are shown in the following table.

| | Artificial Rumen Model Test | | | |
|---|---|---|---|---|
| | | Amphomycin (mg/tube) | | |
| | Control | 0.025 | 0.1 | 0.5 |
| Cellulose[a] digested (%) | 68.3 ± 1.4 | 64.9 ± 2.1 | 64.0 ± 2.4 | 57.5 ± 4.0 |
| Methane[a] produced (cc) | 4.63 ± 0.57 | 2.88 ± 0.47 | 2.53 ± 0.20 | 1.27 ± 0.07 |
| Total calories[a] digested (Calories) | 1144 ± 15 | 1108 ± 22 | 1098 ± 26 | 1029 ± 43 |
| Propionate[ab] | 50.7 ± 1.0 | 58.9 ± 0.9 | 62.1 ± 1.7 | 67.1 ± 4.7 |
| Caloric efficiency[ac] produced | 58.2 ± 7.0 | 62.1 ± 4.5 | 68.9 ± 10.0 | 65.5 ± 16.8 |
| Urease activity[d] | 100 | 90 | 84 | 60 |

[a] Results reported as mean ± one standard deviation. Controls consist of six observations; all other means consist of three observations.
[b] Reported as a percent of total volatile fatty acid calories produced.
[c] Reported as $\frac{\text{Volatile Fatty Acid Calories Produced}}{\text{Total Calories Digested}} \times 100$
[d] % of control

Analysis

In the above test amphomycin can be seen to have significantly increased propionate production and significantly inhibited methane production (responsible for "bloat"). It did not significantly inhibit cellulase or significantly affect total calories digested.

The dose of 0.1 mg. per incubation appears to be the most efficacious; however, bordering doses are acceptable also. As the dose increases, cellulolysis decreases slightly, methane production decreases significantly, propionate production increases significantly and acetate and butyrate production decreases. Higher doses are not detrimental from the standpoint of cellulolysis, but depression in acetate and butyrate production results in lowered improvement in caloric efficiency.

From the above test amphomycin is shown to be useful in improving feed efficiency in ruminant animals having a developed rumen function.

We claim:
1. A method for altering rumen digestion in ruminant animals having a developed rumen function so as to increase the production of propionates, decrease the production of acetates and suppress the production of methane, which method comprises the oral administration to ruminant animals in need thereof feed containing amphomycin at a concentration of from about 4 to 100 grams per ton of feed.
2. The method according to claim 1 wherein the ruminant animals are cattle, sheep or goats.

* * * * *